Feb. 23, 1971     C. F. DE MEY II     3,565,515
MOUNTS FOR OPTICAL ELEMENTS
Filed Dec. 12, 1967
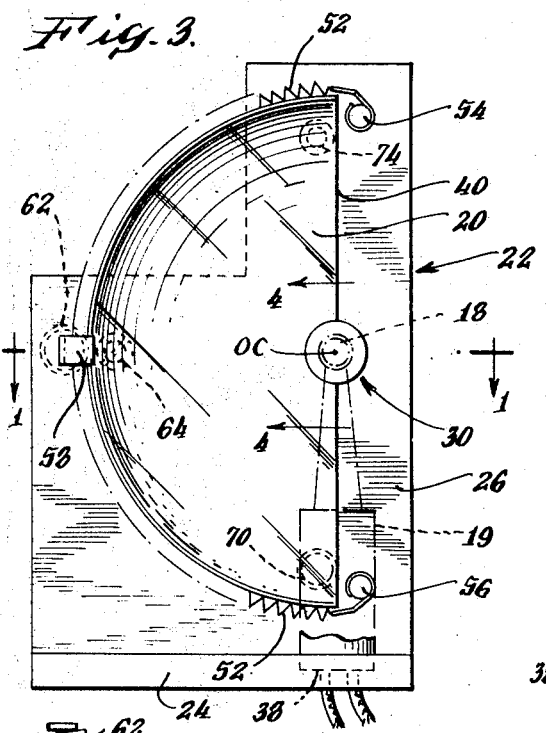
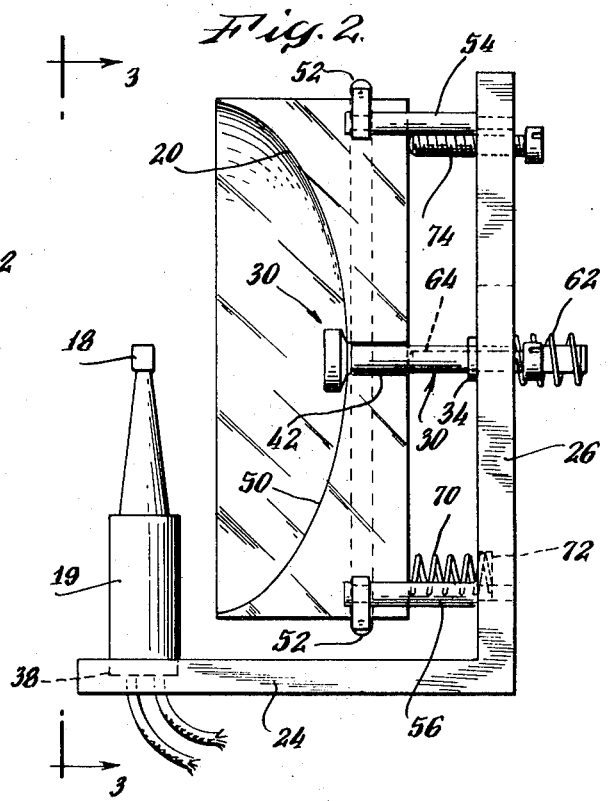
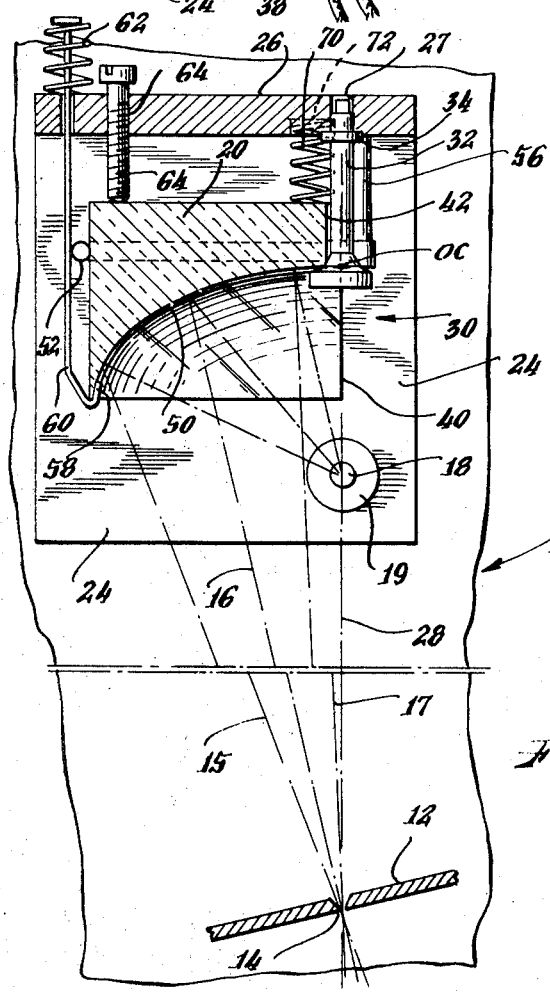
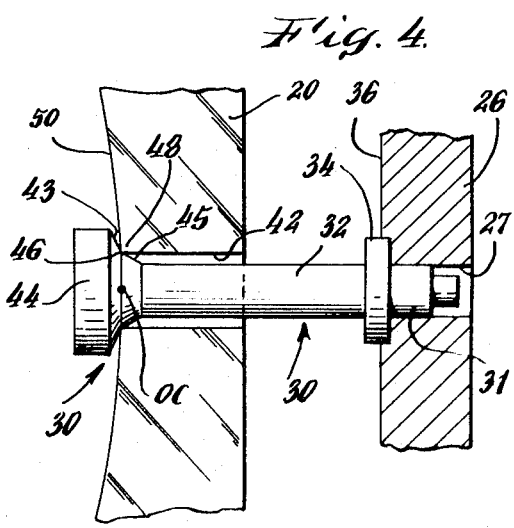
INVENTOR.
Charles F. de Mey, II
BY
ATTORNEY.

United States Patent Office 3,565,515
Patented Feb. 23, 1971

3,565,515
MOUNTS FOR OPTICAL ELEMENTS
Charles Frederic de Mey II, West Redding, Conn., assignor to The Perkin-Elmer Corporation, Norwalk, Conn., a corporation of New York
Filed Dec. 12, 1967, Ser. No. 689,926
Int. Cl. G02b 5/10
U.S. Cl. 350—296         5 Claims

ABSTRACT OF THE DISCLOSURE

A mount for an optical element (for example a concave ellipsoidal mirror) includes a plug for fixing in space the optical center of the element, while allowing tilting of the element for angular adjustment. The optical element is resiliently biased against this plug, and is adjusted by a single screw each for horizontal and vertical tilt. This eliminates adjustment of the optical element not only in its own plane, but also along its optical axis for focusing.

THE INVENTION

This invention relates to apparatus for holding an optical element in a precise manner. More particularly the invention concerns a mount for, for example, a concave mirror in which the mirror may be adjusted about the (horizontal and vertical) axes perpendicular to its optical axis, in which the usual adjustment of the mirror along its optical axis has been eliminated.

The mirror mount according to the invention simplifies both the initial factory adjustment and any further adjustment required after extensive use, by eliminating the need for adjustment of the mirror along its axis (i.e., to change the location of its focal point or points), as well as simplifying the angular adjustments to a single screw each for horizontal and vertical tilt. The invention accomplishes this simplified precision mounting of a mirror by supporting the mirror effectively at its optical center in such manner as to fix this point with reference to the apparatus in which the mirror is used, while still allowing the mirror to be tilted about two axes, both of which are perpendicular to the optical axis (and extend through the optical center) and which are perpendicular to each other. Thus not only is the optical center of the mirror immediately positioned along the desired axis of the instrument with which it is used, but the distance from the optical center of the mirror to the desired position (or positions) of its image plane (or conjugate image planes) is also located in a definite repeatable manner, without the need for adjustment. On the other hand the mirror may still be adjusted both about a (vertical) axis through its optical center and perpendicular to its optical axis, and a second (horizontal) axis through its optical center which is perpendicular to both the first (vertical) axis and its optical axis, by adjustment in each case of a single screw.

An object of the invention is the provision of a precision mount for an optical element, which eliminates the need for focal adjustments of the element (i.e., in directions along its optical axis).

A related object is the provision of such a precise mount, allowing the optical element to be angularly adjusted about its optical center about two mutually perpendicular adjustment axes, both of which are perpendicular to the optical axis, in each case by a single adjusting means.

Further objects, features, and advantages of the invention will become obvious to one skilled in the art upon reading the following detailed specification in conjunction with the accompanying drawing, in which:

FIG. 1 is a horizontal cross section showing the optical element mount of the invention holding (half of) an ellipsoidal mirror, and indicating the location of both foci of such an ellipsoid;

FIG. 2 is a side view of the same mounting device (as seen from the right in FIG. 1);

FIG. 3 is a front view of the mounting device of FIG. 2 (as seen from the direction of the line 3—3 in that figure); and FIG. 4 is an enlarged detail of the center of the mount, taken along the line 4—4 in FIG. 3.

In the exemplary embodiment, the optical element precisely positioned by the mount of the invention, is assumed to be a concave mirror (and more explicitly one-half of an ellipsoidal mirror), but it is obvious that other optical elements may be mounted in similar or at least analogous manners. In FIG. 1 a main mechanism plate of the instrument in which the optical-element mounting device of the invention is to be used is indicated at 10, the instrument being assumed for exemplary purposes to be a spectrometer, with FIG. 1 showing part of the last stage (i.e., detector) of the photometric system. Thus 12 represents the exit slit of the next-to-last stage of the instrument (in this case, the monochromator), and the intensity of the radiation leaving the slit from a small image 14 is to be measured. It is therefore desired to focus the diverging beam composed of the exemplary rays 15, 16 and 17 to a very small area on a small radiation detector, shown generally at 18. As is well known in the optical art, the "correct" optical element for such purpose is (part of) the particular ellipsoidal mirror that has its two geometric foci positioned at the two conjugate image points (i.e., at 14 and at 18). The optical axis of the ellipsoidal mirror 20 should be coincident with the optical axis 28 of the instrument (i.e., the line through the center of optical slit 12 and detector 18). For fixed positions of the desired conjugate image planes 14 and 18, the optical center, OC, of the mirror (i.e., the vertex of the ellipsoid) will then be at a known, fixed distance from each image plane (along axis 28).

To accomplish this positioning of the ellipsoidal mirror 20, and to allow exact angular alignment thereof, the mount of the invention includes a main L-shaped bracket 22, comprising a horizontal plate 24 and a (for example, integrally formed) vertical plate 26. This bracket 22 is attached to the main instrument plate 10 at a precise distance from the slit 12 (and therefore image 14), and in at least fairly precise angular orientation relative thereto, by any conventional means (not shown). A relatively long plug or stud 30 is precisely attached to the vertical plate 26, as by press-fitting end portion 31 of its shank 32 into a hole 27 of plate 26. A shoulder portion 34 (integral with or rigidly attached to shank 32) precisely locates the stud 30 along its own length relative to the plate 26, as by abutting against its front surface 36. In the exemplary embodiment, the horizontal plate 24 of the bracket includes a locating surface (e.g., recess 38, see FIG. 2) for assuring that the detector support 19 (and therefore the detector 18) is located the correct distance away from vertical plate 26 and therefore stud 30. Although this technique of mounting the detector simplifies obtaining the desired distance relationships, obviously the detector 18, 19 could instead be mounted on the main mechanism plate 10 as long as both bracket 22 and plug 30 are in turn precisely mounted as well. In any event plug 30 is precisely mounted (by the illustrated or equivalent means) so as to be aligned with the detector (18) and the slit (12), as indicated at 28 and at the correct distance from each.

Mirror 20 has an essentially straight right-hand (in FIGS. 1 and 3) edge 40, the center of which has been relieved as by a cylindrical drill, so as to leave a semi-cylindrical recess 42 (as may best be seen in FIGS. 2 and 4). The plug 30 includes a large stud head 44 having a rapidly tapering back portion 43, which meets at 46 a slightly tapered portion 45 of the cylindrical main shank portion 32 of plug 30. As may be best seen in FIG. 4, a front corner portion 48 of the mirror 20, defined by intersection of its ellipsoidal front reflecting surface 50 with the cylindrical recess 42, bears against edge 46, defined by the tapered portions 43, 45 of the plug 30. Circular edge 46 of stud 30 has the same diameter as recess 42 in the mirror and will therefore locate the optical center, OC, of the mirror the desired distance from both conjugate image points (at 14 and 18 in FIG. 1) as long as mirror 20 is biased (to the left in FIGS. 2 and 4) against edge 46 of tapered back portion 43 of the stud head 44. The remaining (i.e., so far undescribed) parts of the device not only cause this biasing, but allow tilting of mirror 20 about its optical center OC without moving the latter point.

The structure for holding the mirror 20 against the stud head 44 includes a long spring 52 (see especially FIG. 3) which is wrapped around the circumference of mirror 20 and attached (under tension) at its two ends to upper (at 54) and lower (at 56) holding pins, which pins in turn are rigidly attached to vertical plate 26. Thus long spring 52 tends to bias the entire mirror 20 to the right (as seen in both FIGS. 1 and 3). As best seen in FIG. 1, a hook-like end portion 58 of a wire 60 grips the left-hand edge of the front surface of mirror 20. Wire 60 is biased so as to tend to pull the left-hand edge (as seen in FIG. 1) of the mirror toward the vertical plate 26, as by being formed integrally with a coil spring portion 62, which is under compression tension when the parts are assembled (as in FIG. 1). Resisting the tendency of the left-hand edge (in FIG. 1) of the mirror to be pivoted generally clockwise about stud 30 (by the action of elements 58–62) is an adjustable screw 64, threaded in plate 26. Since both the biasing means (58–62) and the adjusting screw 64 are at the horizontal midline of the mirror 20, movement of screw 64 (as by a small screw driver) will cause the mirror to tilt about a vertical axis (as seen in FIGS. 2 or 3) through its optical center, so as to tilt the mirror in FIG. 1 solely about the axis perpendicular to the plane of the paper and through its optical center (OC).

As may best be seen in FIG. 2, a compression spring 70, one end of which may be set in a small locating recess 72 in vertical plate 26, presses (at its other end) against the back surface of mirror 20 (near its lower right-hand corner as viewed from the front, see FIG. 3). A second adjusting screw 74 (threadily engaged in plate 26) bears against the back surface of mirror 20 near its upper right-hand corner (as seen in the front view of FIG. 3), so that the mirror is biased against the adjusted position of screw 74 by the spring 70. Thus the adjusting screw 74 may be moved in and out to determine the angular position of the mirror 20 relative to horizontal line through its optical center in either FIGS. 1 or 3, which line is perpendicular to the plane of the paper in FIGS. 2 or 4. Preferably adjusting screw 74 should contact the mirror as close as practically possible to a point directly above its optical center (see FIG. 3) to avoid any "cross talk" in the angular adjustment of the mirror "horizontally" (i.e., about a vertical axis) by screw 64 and "vertically" (i.e., about a horizontal axis) by screw 74. Thus the optical axis of the mirror (i.e., the normal to its (incomplete) surface through its optical center, OC) may be exactly aligned with the "optical axis" of the instrument (i.e., the line 28 determined by the center of the slit 12 and the center of the detector 18, see FIG. 1). Preferably, pins 54 and 56 are slightly spaced from edge 40 of the mirror (see FIG. 3), so as to allow a small amount of twist of the mirror about its own optical axis (perpendicular to the plane of the paper and through OC in FIG. 3, or the horizontal in FIGS. 2 and 4), while they limit such twist to a small angle. Such twist does not, of course, affect the optical properties of even an ellipsoidal mirror. However, some limiting of such twist is necessary to cause the long spring 52 to remain in even contact with the circular periphery of the mirror, to avoid great variation in the location of the hook end 58 of the wire spring 60, 62, and to avoid movement of the mirror edge 40 to the left in FIG. 3 of either spring 70 or adjusting screw 74.

Thus by locating the optical center of the mirror 20 (or equivalent optical element) at a fixed point at the correct distance from the object or objects (in this case elements 12 and 18) with which the optical element is to be used and on the correct line (i.e., the instrument "optical axis" 28), a mount according to the invention eliminates any need to adjust the focus or lateral position of the optical element. Additionally the mount of the invention allows the two remaining alignment adjustments to be made by a single screw each, without any substantial effect (i.e., decalibration) of one adjustment relative to the other. In this manner the inventive mount greatly simplifies both the initial adjustment of the optical instrument upon assembly following manufacture, and any subsequent adjustment that may be necessary (for example when replacing any one or more of the various parts, or any undesirable changes that may occur during use from warping, wear or the like).

Although both cylindrical recess 42 in the optical element (i.e., mirror 20) and the locating or bearing surface 46 of the stud 30 have circular cross sections in the exemplary embodiment, it should be noted that only the of these cooperating surfaces need be circular without causing any restricting of the universality of the tilting movement of the optical element.

Although the invention has been described in conjunction with its use for mounting a concave mirror (and more particularly a mirror which is part of an ellipsoid), it may obviously be utilized not only for mirrors having flat or even convex surfaces, but also may be utilized for mounting wholly or partially refractive optical elements as well. Although the exemplary mount is particularly easy to utilize with an optical element (such as half of a circular element) in which the optical center is at or near an edge of the element itself, it is obviously readily adaptable to use with "whole" elements in which the optical center is substantially at their geometric center, although this will cause loss of practical use of a small area at the center (i.e., somewhat larger than involved in the simplified, half-ellipsoidal mirror mount). Because of this obvious adaption to different optical elements, including circular ones, the invention is not intended nor deemed to be limited to use with any particular type of optical element, or ones having any particular overall shape.

I claim:

1. An improved device for mounting in correct optical alignment an optical element, having one optical surface which is substantially the solely optical effective surface of said element, in an instrument, while obviating any adjustment of position of the optical center of said element in directions both along and transverse to its optical axis, comprising:

means for precisely and directly holding said primarily solely optically effective surface near said optical axis and therefore for locating the optical center of said optical element at a fixed point relative to said instrument, said holding means nevertheless allowing said optical element to pivot freely substantially about its optical center;

said holding means comprising: a locating portion of said optical element formed by the intersection at a substantial angle of said primarily solely optically effective surface and a relatively small central recess defined by an interior wall surface of said optical element substantially concentric with the optical axis of said optical element; a fixed member having an exterior locating surface, which is precisely located relative to the instrument; and means for biasing said locating portion of said optical element in cooperative engagement with said exterior locating surface of said fixed member;

each of said locating portion of said optical element and said exterior locating surface of said fixed member being of substantially mating circular cross-section at the position of their mutual engagement, whereby said optical element may pivot universally substantially about its optical center around said fixed member;

and tilt adjustment means for determining the angular position of said optical element about a pair of mutually perpendicular axes, both of which are perpendicular to the optical axis of said optical element and extend substantially through said optical center;

said exterior locating surface of said fixed member and said locating portion of said optical element being of such relative configuration that said optical center of said optical element is located in an exact predetermined desired position in the instrument at least for a particular angular relationship of said optical element relative to said fixed member, whereby any small angular adjustment of said optical element from said particular angular relationship will cause only extremely small changes in position of said optical center thereof relative to said instrument, since said locating portion is part of said primarily solely optically effective surface defining said optical center of said optical element.

2. A mounting device according to claim 1, in which:
said optical element is so shaped that its said optical center is substantially at an external edge of said element;

said central recess therefore being substantially a relieved notch in said external edge of said optical element; and said biasing means comprises auxiliary biasing means laterally pressing said optical element to maintain engagement of said locating portions of the interior wall surface defining said notch against said exterior surface of said fixed member.

3. A mounting device according to claim 2, in which:
said optical element has a generally semicircular overall cross section in the plane perpendicular to its optical axis, said external edge of said element being substantially along the straight-edge diameter of such semicircle and having said notch substantially at its linear center; and said auxiliary biasing means comprises a long tension spring engaging the remaining semi-circular edge of said optical element, whereby the tension of said long spring tends to maintain said engagement between said locating portion of said interior wall surface defining said notch and said exterior surface of said fixed member.

4. A mounting device according to claim 1, in which:
said tilt adjustment means comprises a pair of adjustable screws each engaging a surface of said optical element, which surface is substantially perpendicular to its optical axis;

one of said adjusting screws contacting said surface at a first point, and the other of said adjusting screws contacting said surface at a second point;

the line drawn between said first point and the optical axis is substantially perpendicular to the line drawn between said second point and said optical axis, whereby one of said adjusting screws independently adjusts the vertical tilt of said optical element about its optical center, and the other said adjusting screw independently adjusts the horizontal tilt of said optical element about its optical center.

5. A mounting device according to claim 4, in which:
spring means are provided for resiliently biasing said optical element against both of said adjusting screws.

References Cited
UNITED STATES PATENTS

| | | | |
|---|---|---|---|
| 1,428,935 | 9/1922 | Bell | 350—55 |
| 1,578,899 | 3/1926 | Lohmann | 350—55 |
| 3,027,807 | 4/1962 | Barcus et al. | 350—289 |
| 3,357,268 | 12/1967 | Richter | 350—310X |
| 3,334,959 | 8/1967 | Walsh | 74—89.15X |
| 3,478,608 | 11/1969 | Met | 74—89.15 |

DAVID SCHONBERG, Primary Examiner

J. W. LEONARD, Assistant Examiner

U.S. Cl. X.R.

74—89.15; 343—761; 356—74